United States Patent
May et al.

(10) Patent No.: US 6,687,426 B1
(45) Date of Patent: Feb. 3, 2004

(54) OUT OF BAND FIBER CHARACTERIZATION USING OPTICAL AMPLIFIER LIGHT SOURCES

(75) Inventors: Gregory D. May, Ottawa (CA); Gen G. Ribakovs, Stittsville (CA); Avid E. Lemus, Ottawa (CA); Marc Gagnon, Hull (CA)

(73) Assignee: Nortel Networks Limited, St. Laurent (CA)

(*) Notice: Subject to any disclaimer, the term of this patent is extended or adjusted under 35 U.S.C. 154(b) by 136 days.

(21) Appl. No.: 09/749,568

(22) Filed: Dec. 28, 2000

(51) Int. Cl.[7] ................................................ G02B 6/00
(52) U.S. Cl. ........................ 385/15; 385/147; 356/73.1
(58) Field of Search ........................... 385/15, 31, 147; 356/73.1

(56) References Cited

U.S. PATENT DOCUMENTS

| | | | | |
|---|---|---|---|---|
| 4,234,253 A | * | 11/1980 | Higginbotham et al. | 356/73.1 |
| 4,257,707 A | * | 3/1981 | Liertz et al. | 356/73.1 |
| 4,551,019 A | * | 11/1985 | Vella et al. | 356/73.1 |
| 4,673,291 A | * | 6/1987 | Heckmann | 356/73.1 |
| 4,714,343 A | * | 12/1987 | Ide | 356/73.1 |
| 4,726,676 A | * | 2/1988 | Maslaney et al. | 356/73.1 |
| 4,750,833 A | * | 6/1988 | Jones | 356/73.1 |
| 4,752,125 A | * | 6/1988 | Schicketanz et al. | 356/73.1 |
| 4,890,915 A | * | 1/1990 | Byvik et al. | 356/73 |
| 4,996,420 A | * | 2/1991 | Redford | 250/227.24 |
| 5,078,489 A | * | 1/1992 | Lieber | 356/73.1 |
| 5,455,672 A | * | 10/1995 | Lamonde et al. | 356/73.1 |
| 5,592,284 A | * | 1/1997 | Bedard | 356/73.1 |

OTHER PUBLICATIONS

Woodland, "Fiber Optic Measurements: A Review of Recent Methodology", IEEE Instrumentation and Measurement Technolog Conference, Mar. 1986, pp. 219–223.*

Santoni, "Master Measurement Techniques to Polish Fiber–Optic Performance", EDN (USA), vol. 25, No. pp. 117–122, Apr. 5, 1980.*

* cited by examiner

Primary Examiner—Akm Enayet Ullah
Assistant Examiner—Michelle R. Connelly-Cushwa

(57) ABSTRACT

An accurate method for characterizing optical fiber using a modest enhancement to equipment that is already in place for other purposes within an optical transmission system is thereby disclosed. In particular, optical amplifier light sources already embedded in transmission equipment are used to provide accurate characterization information in addition to their conventional purpose. Therefore, the invention permits fiber characterization at little additional cost over the optical amplifier light sources already present in a system. Furthermore, the need of going out to the field, disconnecting the transmission equipment and performing the field measurements with separate test equipment is eliminated.

46 Claims, 3 Drawing Sheets

OUT OF BAND FIBER CHARACTERIZATION USING OPTICAL AMPLIFIER LIGHT SOURCES

FIELD OF THE INVENTION

This invention relates to methods and apparatus for testing optical fiber communication links in optical communication systems and, more particularly, to methods and apparatus for characterizing an optical fiber using optical amplifier light sources.

BACKGROUND OF THE INVENTION

Optical transmission systems are quickly evolving to multi-Terabit per second (Tb/s) capacity. Successful deployment of these systems requires accurate characterization of the fibers that connect all the transmission equipment together. Such characterization information includes fiber attenuation, chromatic dispersion, polarization mode dispersion (PMD) and back-reflection among others. This information allows the network provider to deploy the appropriate compensation techniques to mitigate deficiencies in the fibers, and also allows the network provider to understand the ultimate transmission distance limitations within the system.

In the field, fiber characterization information must be evaluated in conjunction with the installation of new optical transmission systems or the upgrade of existing routes to higher bit rates. For example, control of the total chromatic dispersion of transmission paths is critical to the design and construction of long-haul, high-speed, high-capacity telecommunications systems. Similarly, PMD of older installed fibers is typically much higher than recently manufactured fibers, and system integrators often need to measure these installed fibers as they plan to upgrade their systems to higher bit rates.

Fiber characterization is of particular importance to high-capacity fiber optic systems such as Dense Wavelength Division Multiplexed (DWDM) systems with many high bit-rate (e.g. 10 Gb/s and above) channels in place. In many cases, it is not possible to install the system at all without this information. There are currently at least ten different optical fiber types examples of which include Non-Dispersion Shifted Fiber, Dispersion Shifted Fiber, True Wave Classic®, True Wave Plus®, True Wave Minus®, True Wave RS®, All Wave®, LEAF®, E-LEAF®, LS®, etc. Each of these fiber types have different characteristics yielding varying levels of performance. Identification of the fiber type is, therefore, essential in providing accurate characterization information as system upgrade costs differ radically based on the type of fiber installation.

Where the fiber characterization information may be estimated from knowing the fiber length and fiber type, it may be possible to deploy a system for applications that do not have extended reach or capacity. However, suppliers in this case would be unable to permit customers to deploy these systems in aggressive applications. For example, such a case may occur when a customer wants extended reach or capacity and is unwilling to characterize the fiber in full. In addition to the above, some customers do not have accurate records regarding the type of fiber they have installed in the field. This information is essential to allow them to estimate the fiber characteristics from the length.

Generally, the customer may estimate fiber characteristics from length and type information. However, this does not supply them with enough information for suppliers to specify the most aggressive system. Subsequently, the customer may have to take measurement equipment out to the field to collect accurate fiber characterization information. This requires a coordinated effort (potentially at both ends of the fiber) to identify the fiber strand in question, disconnect the transmission equipment, make the measurement, record the results, and communicate these results to the equipment deployment team.

Several measurement techniques presently exist for characterizing optical fibers, the most popular of which is Optical Time Domain Reflectometry (OTDR). Optical time domain reflectometers (OTDRs) are frequently used to measure a variety of optical fiber properties. OTDRs operate by sending a short pulse of laser light down an optical waveguide fiber and observing the small fraction of light that is scattered back towards the source. This small fraction of light represents attenuation and reflectance in the optical fiber under test. By measuring the amount of backscattered and/or reflected signal versus time, the loss versus distance of the optical fiber is measured. Furthermore, it is known that an OTDR can be employed in combination with a variable wavelength laser source in order to display the effect of wavelength dependent fiber attenuation and chromatic dispersion of an optical fiber path.

However, OTDR systems requiring a wavelength-tunable pulsed light source and/or multiple light sources for the test signals impose a high degree of complexity not to mention cost. Furthermore, the use of separate OTDR systems to collect reflectance data necessitates the dispatching of experienced craftspeople to the field with a high level of expertise to perform the measurements. An inexpensive technique for testing optical fibers without the use of a tunable OTDR pulsed light source would, therefore, be highly beneficial.

SUMMARY OF THE INVENTION

The present invention discloses a method for characterizing an optical transmission fiber using a modest enhancement to equipment that is ordinarily embedded within an optical transmission system. The apparatus of the invention is embedded in the transmission equipment itself, thereby eliminating the need to dispatch a craftsperson for performing field measurements. The method and apparatus of the present invention, therefore, eliminates the need for having to take the optical transmission system out of operation in order to isolate the optical transmission fiber to be characterized. Although it is already known to embed separate test equipment into a system application using established methods (e.g. OTDR), this is necessarily more expensive than the method and apparatus of the present invention since it requires the use of additional test laser sources.

According to a first broad aspect of the invention, there is provided a method for characterizing an optical transmission fiber comprising operating an optical light source so as to launch an optical signal into a first end of the optical transmission fiber, detecting at a second end of the optical transmission fiber a residual optical signal resulting from the optical signal launched into the first end of the optical fiber and characterizing the optical transmission fiber on the basis of the detected residual optical signal.

According to another broad aspect of the invention, a Raman pump laser is used as the light source for characterizing the optical transmission fiber.

According to another broad aspect of the invention, an optical service channel (OSC) laser source is used as the light source for characterizing the optical transmission fiber.

According to another broad aspect of the invention, a plurality of optical light sources, each operating at a particular wavelength, are used for characterizing the optical transmission fiber in a wavelength band defined by the plurality of optical light sources.

According to another broad aspect of the invention there is provided a method for characterizing an optical transmission fiber comprising operating an OSC laser source so as to launch an optical signal into a first end of the optical transmission fiber, detecting a reflected optical signal at the first end of the optical transmission fiber resulting from the optical signal launched into the first end of the optical transmission fiber and characterizing the optical transmission fiber on the basis of the reflected Raman pump light detected at the first end of the optical transmission fiber.

According to another broad aspect of the invention, there is provided an optical transmission system for transmitting multi-channel optical signals over an optical transmission path, the optical transmission path including an optical transmission fiber interposed between a first node and a second node wherein the multi-channel optical signals are transmitted over the optical transmission fiber from the first node to the second node, the optical transmission system comprising at least one optical light source provided at the second node operable to inject an optical signal into the optical transmission fiber for transmission to the first node, at least one photodetector at the first node for detecting a residual optical signal resulting from the optical signal injected into the optical transmission fiber at the second node and a processing agent for characterizing the optical transmission fiber on the basis of the optical signal injected at the second node and the residual optical signal detected at the first node.

According to another broad aspect of the invention there is provided apparatus for characterizing an optical transmission fiber comprising at least one optical light source operable to inject an optical signal into a first end of the optical transmission fiber, at least one photodetector at the first end of the optical transmission fiber for detecting a reflected optical signal resulting from the optical signal injected into the first end of the optical transmission fiber and a processing agent for characterizing the optical transmission fiber on the basis of the optical signal injected into the first end of the optical transmission fiber and the reflected optical signal detected at the first end of the optical transmission fiber.

Other aspects and features of the present invention will become apparent to those ordinarily skilled in the art upon review of the following description of specific embodiments of the invention in conjunction with the accompanying drawings.

DESCRIPTION OF THE PREFERRED EMBODIMENTS

Long distance lightwave communication systems require optical amplifiers for boosting optical signal levels sufficiently to compensate for losses experienced along the optical fiber transmission medium. Optical amplifiers may generally be classified into two categories: lumped amplifiers and distributed amplifiers. An exemplary lumped amplifier is the rare earth doped fiber amplifier, which offers substantial benefits because of its simplicity, low cost, and connective compatibility with existing optical fibers. These amplifiers increase the optical signal power of a supplied input signal via stimulated emission of fiber dopants such as erbium that is subject to an optical pump source. A series of fiber amplifiers, therefore, compensates for attenuation in the system via a gain process.

Distributed amplifiers include Raman amplifiers in which amplification is based on stimulated Raman scattering (SRS). Raman gain is generated by direct optical pumping of the transmission fiber and hence such amplifiers provide distributed amplification over an extended portion of the transmission path, often on a substantially uniform basis.

As a result, Raman amplification may also be employed as a gain mechanism for effectively reducing the impact of transmission path loss. Distributed Raman amplification increases the distance between the optical amplifiers (EDFAs) used to boost data signals thereby cutting costs and allowing higher data capacity by spacing wavelength channels closer together. Raman amplification is, therefore, often used in conjunction with doped fiber amplification.

Figure 1:
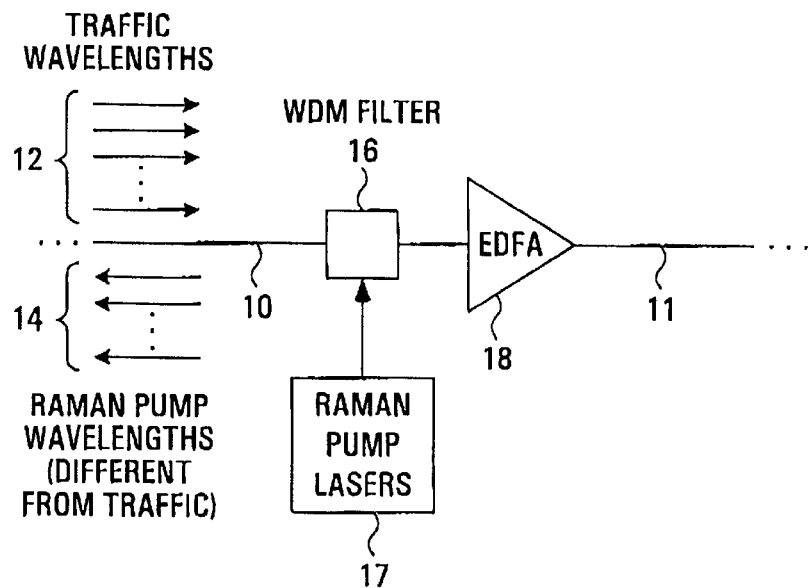
FIG. 1 is an example portion of a typical optical fiber communication link employing Raman amplification and rare-earth doped fiber amplification.

As an example, consider FIG. 1 which depicts an example of a typical arrangement provided in an optical fiber communication link employing both Raman amplification and rare-earth doped fiber amplification. A section of optical transmission fiber 10, used to carry a series of optical traffic wavelengths 12 in one direction is connected to a wavelength division multiplexer (WDM) filter 16. In general, a plurality of Raman pump lasers 17 feed into the WDM filter 16 which couples a corresponding set of Raman pump wavelengths into the optical transmission fiber 10. The WDM filter 16 is further connected to an erbium-doped fiber amplifier (EDFA) 18 whose amplified output is coupled into a subsequent section of optical transmission fiber 11.

The WDM filter 16 performs the function of coupling the Raman pump laser wavelengths into the optical transmission fiber 10. The Raman pump lasers 17 are used to supply energy in the form of Raman pump wavelengths 14 to the optical transmission fiber 10. As indicated, these lasers often transmit power in the opposite direction to regular traffic, represented in FIG. 1 by the traffic wavelengths 12. As is well known, these pump sources may alternatively be arranged to transmit power in the same direction as regular traffic but this is generally avoided since it leads to an associated performance penalty. The fiber medium acts to transfer energy in the Raman pump wavelengths 14 into energy for the traffic wavelengths 12, which results in a gain process. This gain process works against the attenuation in the fiber plant. An assortment of laser wavelengths is often used to make the gain as broadband (in wavelength terms) as possible.

In most current systems, such as that depicted in FIG. 1, the EDFAs are enhanced by Raman amplification in which high-power laser light is sent in the direction opposite that traveled by the data signals (traffic), thereby transforming part of the optical transmission fiber, itself, into an amplifier of the signals passing through it.

Figure 2:
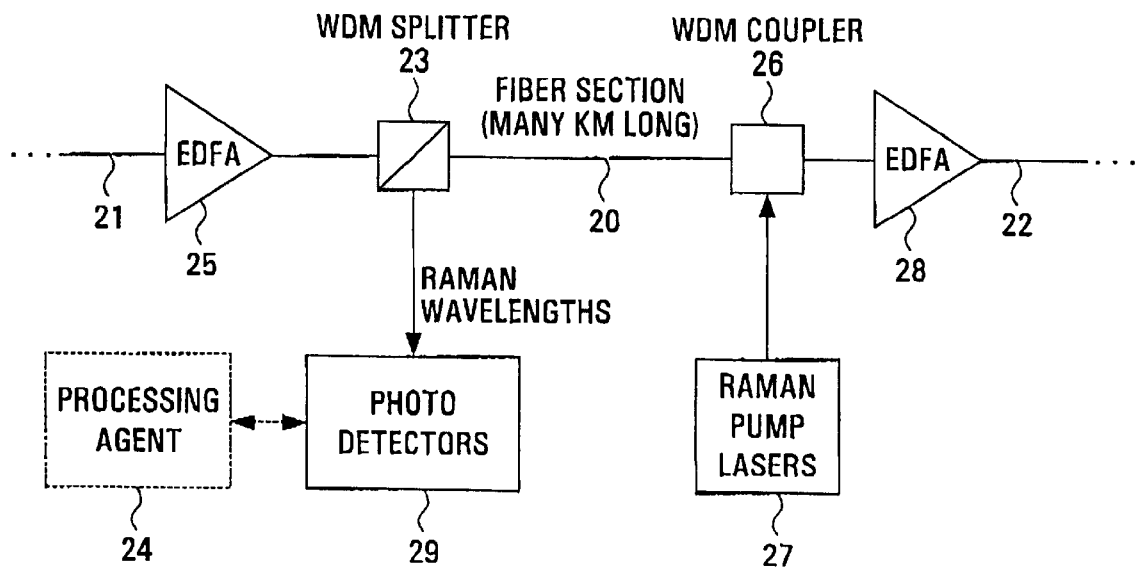
FIG. 2 provides an example implementation used to characterize an optical fiber communication link according to a first embodiment of the invention.

In view of the above, the technique of the present invention proposes to set up a receiver at the far (transmit) end of the optical transmission fiber to receive residual Raman pump light. For example, FIG. 2 provides an arrangement that may be used to characterize an optical transmission fiber 20 according to a first embodiment of the invention. A span of optical transmission fiber 20 is connected between a WDM splitter 23 and a WDM coupler 26. Preceding the WDM splitter 23 is an EDFA 25, the input of which is coupled to a length of optical transmission fiber 21. Following the WDM coupler 26 is a second EDFA 28 whose amplified output is coupled into a subsequent length of optical transmission fiber 22. A plurality of Raman pump lasers 27 feed into the WDM coupler 26 which couples a corresponding set of Raman pump wavelengths into the optical transmission fiber 20. These Raman pump wavelengths will be counter-propagating to the normal direction of traffic flow which is from EDFA 25 to EDFA 28. The WDM splitter 23 is responsible for providing the counter propagating Raman wavelengths to a plurality of photodetectors 29. Each Raman wavelength is detected independently by a separate photodetector. Alternatively, the counter propagating Raman wavelengths may be detected together and then separated by a suitable signal processing technique on the basis of their modulation. The photodetectors 29 are further coupled to a respective processing agent 24.

Other well-known parts which may comprise an optical communication system such as the drive electronics, splices, attenuators, couplers, etc., are considered to be conventional and known in the art and have thus been omitted from all the figures.

The WDM coupler 26 and WDM splitter 23 are well known components in the art and are simply filters used to combine or separate optical signals, respectively, according to their wavelength. In the arrangement of FIG. 2, the Raman pump lasers 27 are used to inject Raman light into the optical transmission fiber 20 via the WDM coupler 26. The photodetectors 29 may then receive and measure the power in the residual counter propagating Raman light via the WDM splitter 23.

By performing such power measurements, two important fiber parameters may be determined i.e. the attenuation of the fiber as it applies to the Raman pump wavelength band and the chromatic dispersion of the fiber as it applies to the Raman pump wavelength band. These measurements may then be converted to respective estimates for fiber attenuation and chromatic dispersion in the traffic wavelength band.

Generally speaking, no traffic wavelengths should be present during the fiber characterization process according to the present invention. This condition can obviously be met before the system is actually put into service, as will most often be the case when fiber characterization takes place. However, it should be noted that the characterization process of the present invention may indeed occur with live traffic present, provided that the equipment vendor has qualified potential traffic performance impacts with the customer who has accordingly accepted such implications.

The first fiber parameter that may be determined using the arrangement of FIG. 2 is the attenuation of the fiber as it applies to the Raman pump wavelength band. For each wavelength, this will be the difference between the launch power of the respective Raman pump laser 27 and the received power at the corresponding photodetector 29, taking into account fixed path losses which occur within the amplifier blocks (i.e. WDM splitter 23 and WDM coupler 26) and depletion due to any existing traffic wavelengths if at all present. The fixed path losses associated with the WDM splitter 23 and WDM coupler 26 may be calibrated in the factory at 'start of life' as is well known in the art.

The arrangement presented in FIG. 2 may further be used to determine the chromatic dispersion of the optical transmission fiber 20 as it applies to the Raman pump wavelength band. To do so, known driving signals (in frequency, amplitude and phase) are applied to the Raman pump lasers 27 and phase information is then collected at the receiving photodetectors 29. Then, the relative difference in phase between the source driving signals at the Raman pump lasers 27 and the received signals at the photodetectors 29 for each pair of adjacent Raman wavelengths corresponds to the different propagation time of the wavelengths, which can then be used to derive the chromatic dispersion for the particular wavelength interval.

Both of the measurements described above will obviously require some form of communication path to be established between source and receiver i.e. between the Raman pump lasers 27 and the photodetectors 29. Advantageously, most current optical transmission systems already typically incorporate some form of communication path between optical components such as the amplifier sites (i.e. EDFA 25 and EDFA 28) depicted in FIG. 2. In such instances, the required communication infrastructure may be realized using the well known Optical Service Channel (OSC) or any other equivalent.

The chromatic dispersion and attenuation profiles derived for the optical transmission fiber 20 in the Raman pump wavelength band may then be converted to corresponding estimates for the traffic wavelength band. Specifically, the chromatic dispersion and attenuation information, as determined above for the Raman pump wavelength band, may be compared against similar known characteristics (or signatures) in the Raman pump wavelength band for the different fiber types (e.g. Non-Dispersion Shifted Fiber, Non-Zero Dispersion Shifted Fiber, TrueWave, LEAF, etc.). In this way, the type of fiber or at least the family of fibers to which the fiber belongs may be identified.

In FIG. 2, the processing agent 24 manages the entire measurement and characterization process. The processing agent 24 may be implemented by some form of control software with the necessary processor complex (i.e. cpu, memory, non-volatile memory, communications ports and other necessary hardware). Those skilled in the art will appreciate that such a processing agent may be resident on one or more amplifier circuit packs and their associated processor complex or on an external computing platform.

The known characteristics (e.g. attenuation and chromatic dispersion) in the Raman pump wavelength band for each fiber type may subsequently be organized in database form and stored in, for example, the random access memory (RAN) of the processing agent 24. Such a database, for example, may comprise a series of records each of which consists of a known attenuation and chromatic dispersion profile in the Raman pump wavelength band for each fiber type. A successful match between the measured characteristics and a particular record in the stored database will then yield the fiber type.

It should be noted that the determination of the precise fiber type is not critical in a given fiber characterization process. The key parameters of interest are the attenuation and chromatic dispersion in the traffic wavelength band. As demonstrated, the technique of the present invention may be used to determine these parameters with respect to the Raman pump wavelength band. Based on this information, the attenuation and chromatic dispersion for the traffic wavelength band may be estimated using a suitable extrapolation algorithm.

In some specific situations, the network provider may desire to provision the appropriate fiber type i.e. stipulate what fiber is really there instead of looking for a match. Typically, this may over-ride the fiber type determined by the above characterization process. If a significant mismatch between the detected fiber type and the provisioned fiber type is observed, an alarming mechanism may be triggered to alert the user in order that appropriate courses of action be taken. For example, after clearing the alarm, the fiber type may be re-provisioned to match the detected fiber type.

Finally, the chromatic dispersion and attenuation characteristics of the transmission fiber for normal traffic flow may be estimated, using known relationships between these parameters in the Raman pump wavelength band and the traffic wavelength band for the fiber type in question. In other words, by allowing determination of the type of fiber, the present invention further provides for the determination of fiber attenuation and chromatic dispersion in the traffic wavelength band.

Advantageously, the arrangement of FIG. 2 is very well suited to measure the polarization mode dispersion (PMD) of the length of transmission fiber in question. Polarization mode dispersion is a form of pulse dispersion caused by the varying polarization properties of optical fiber. If undetected, it can result in the receiver being unable to interpret the signal correctly and cause high bit error rates.

In addition to the inherent, varying polarization properties of fiber, stress and other environmental influences (such as changes in temperature and humidity) will directly affect the severity of the impact of PMD, causing it to change over time. In fact, the initial PMD measurement taken when the fiber is first pulled is likely to be different from the PMD reading after cabling or installation.

MD can dramatically decrease a fiber optic network's performance, particularly those networks operating at high data rates such as OC48 or OC192. Therefore, it's critical to test installed fiber before upgrading to higher data rates or installing DWDM systems. In this way, the link performance may be qualified and, if necessary, the use of some form of active PMD compensation may be planned for.

To measure the PMD of a length of optical transmission fiber, two Raman pump lasers may be used to realize a pulse-delay type of setup similar to FIG. 2. In this case, however, each Raman pump laser 27 will feed into a polarization rotator (not shown) prior to the WDM coupler 26 in order that orthogonal polarization states may be launched into the optical transmission fiber 20. Then, the resulting difference in propagation time between the polarization modes as measured at the far-end of the fiber defines the differential group delay and allows for direct observation of the impact of PMD.

Figure 3:
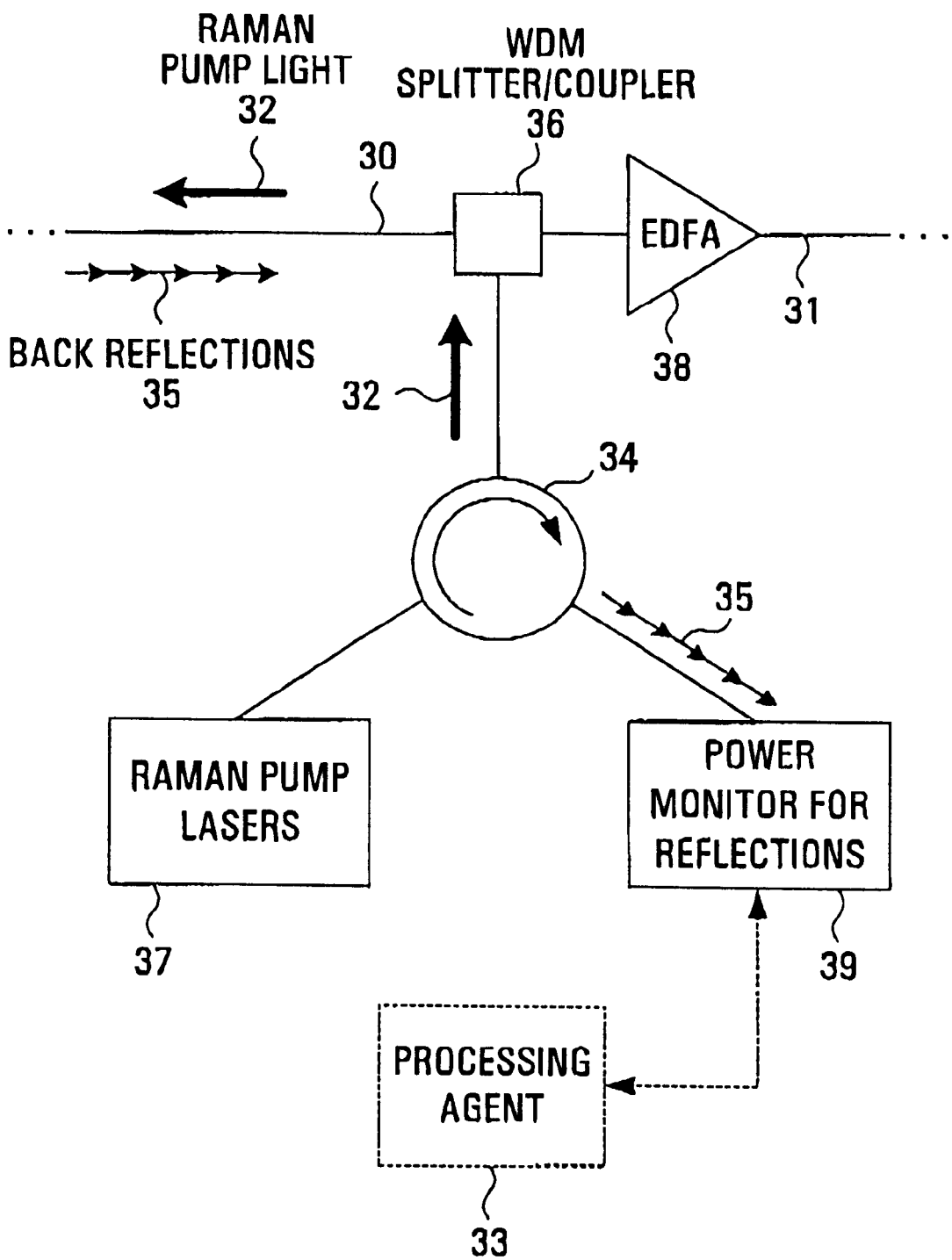
FIG. 3 is an example of an implementation used to characterize an optical fiber communication link according to a second embodiment of the invention.

In another embodiment of the invention, characterization of an optical transmission fiber may be conducted using an OTDR type arrangement such as that depicted in FIG. 3. In this case, a length of optical transmission fiber 30 is coupled to a WDM splitter/coupler 36 which precedes an EDFA 38. The amplified output of the EDFA 38 is coupled into a subsequent length of optical transmission fiber 31. A plurality of Raman pump lasers 37 feed into an optical circulator 34, and a corresponding set of Raman wavelengths 32 are then provided to the WDM splitter/coupler 36 to facilitate Raman amplification within the preceding length of optical transmission fiber 30 under normal system operation.

However, in this particular embodiment, at least one or more Raman pump lasers may further serve as the optical source(s) for an OTDR type function. Accordingly, the WDM splitter/coupler 36 is also connected via the optical circulator 34 to a power monitor 39 which measures any back-reflections 35 propagating in the optical transmission fiber 30. A processing agent 33 is further coupled to the power monitor 30. As in the embodiment of FIG. 2, the role of the processing agent 33 includes managing all aspects of the fiber characterization process.

Characterization of optical transmission fiber in accordance with the embodiment of FIG. 3, therefore, does not require any far-end detectors as depicted in FIG. 2. Instead, the one or more Raman pump lasers 37 are used to provide a type of Optical Time Domain Reflectometer (OTDR) application. For example, a Raman pump laser 37 may be used to supply a short pulse of light 32 which is launched into the optical transmission fiber 30 via the WDM coupler/splitter 36. The Raman pump light 32 is transmitted down the transmission fiber 30, and backscattered light in the form of a series of back-reflections 35 is then monitored at the source end by the power monitor 39. Just like any well known commercially available OTDR, this technique may be used to supply a profile of fiber reflection and attenuation versus distance.

At present, OTDR employs separate test equipment and requires a means of coupling this equipment into the access fibers. This usually requires the installation of costly filter equipment and introduces consequent losses into the system. However, the inventive technique provides an OTDR function at little cost over the Raman pump lasers. The collected reflection data will be directly applicable to the Traffic Wavelength Band provided there are no wavelength sensitive devices in the fiber path. The reflected light may be monitored for abrupt changes indicative of a loss or fault in the optical transmission fiber. As per conventional OTDR techniques, the distance of the loss or fault from the launch end of the fiber can be determined from the time interval between the launch and the return of the reflected peak. Note that the reflection locations will generally be wavelength independent.

Therefore, in addition to their primary role in providing Raman amplification for ordinary optical transmission systems, the Raman pump lasers may serve a dual function in accordance with the embodiments of FIGS. 2 and 3 in that they may also act as optical sources for fiber characterization measurements.

Those skilled in the art will appreciate that optically amplified systems such as the one depicted in FIG. 2 ordinarily have one or more Optical Service Channels (OSCS) that create a messaging link between respective amplifier sites. In such arrangements, each amplifier site is usually equipped with both an OSC laser source and an OSC receiver. All measurements that require only one wavelength can, therefore, be made with this laser source instead of the Raman pump laser. OSC laser sources are, however, generally configured to propagate light in the same direction as the traffic wavelengths; otherwise their application in the above context is identical to that of the Raman pump laser embodiment described in accordance with FIG. 2.

Figure 4:
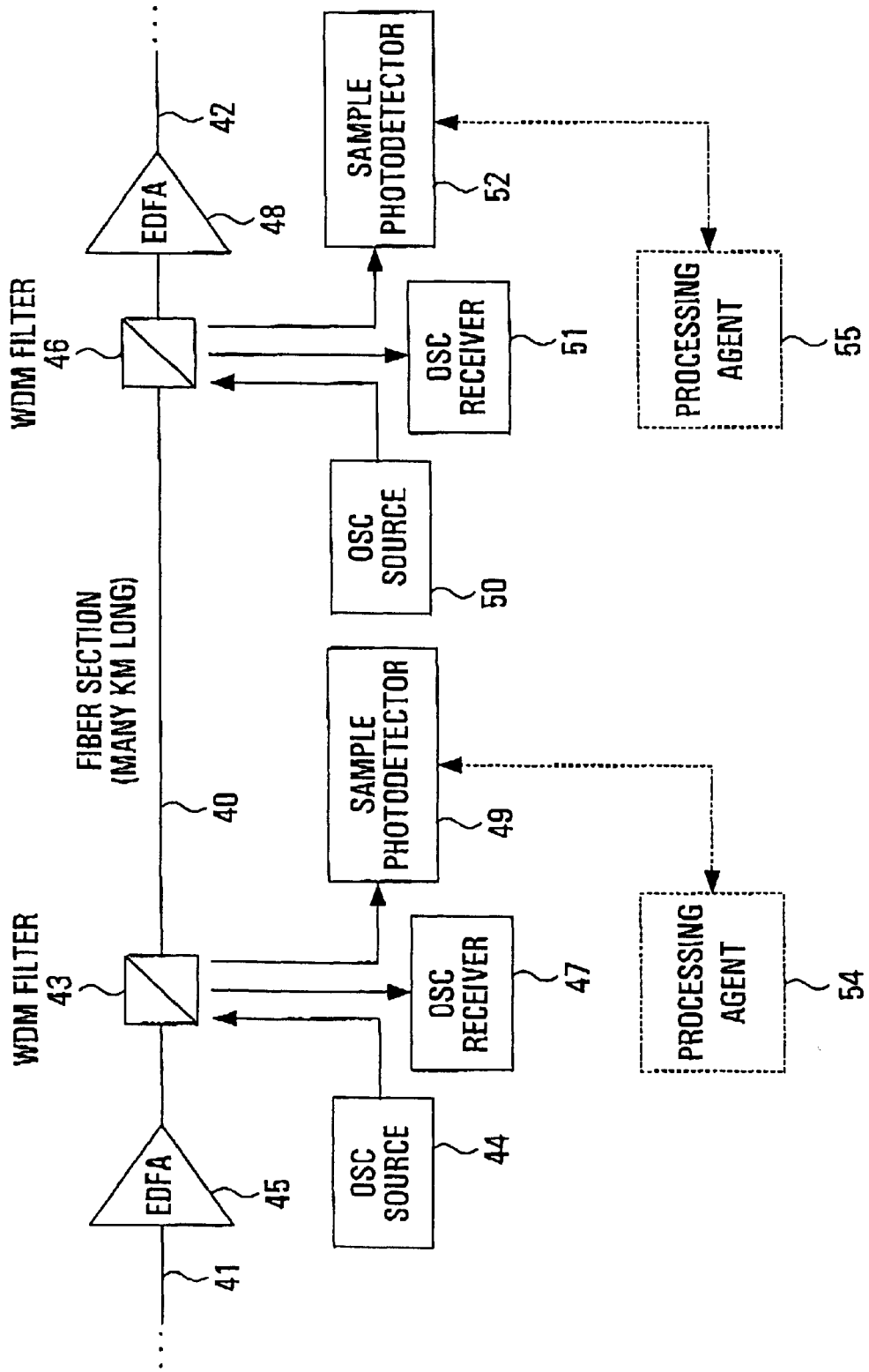
FIG. 4 is an example of an implementation used to characterize an optical fiber communication link according to a third embodiment of the invention.

For example, FIG. 4 depicts a further embodiment of the present invention which utilizes an OSC laser source, typically found in optically amplified systems, for performing optical fiber characterization. In this particular arrangement, a span of optical transmission fiber 40 is connected between a first WDM filter 43 and a second WDM filter 46. Preceding the first WDM filter 43 is a first EDFA 45, the input of which is coupled to a preceding length of optical transmission fiber 41. Following the second WDM filter 46 is a second EDFA 48 whose amplified output is coupled into a subsequent length of optical transmission fiber 42.

In the optically amplified system of FIG. 4, each amplifier site is equipped with an OSC source and OSC receiver as is convention. Specifically, an OSC laser source 44 and an OSC receiver 47 are coupled to the WDM filter 43 at the first EDFA 45. Similarly, an OSC laser source 50 and an OSC receiver 51 are coupled to the WDM filter 46 at the second EDFA 48. Sample photodetectors 49 and 52 are further coupled to WDM filters 43 and 46, respectively. The sample photodetectors 49 and 52 are coupled to processing agents 54 and 55, respectively, which are responsible for managing all aspects of the fiber characterization process.

Consequently, fiber characterization measurements requiring only one wavelength (e.g. attenuation, OTDR applications) may alternatively be made using the OSC laser source typically found in such systems. For example, the OSC laser source 50 coupled to the WDM filter 46 may be used to launch an optical pulse into the length of optical transmission fiber 40. The sample photodetector 52 may then be used to monitor the back-scattered signal which, of course, will be of the same wavelength as that produced by the OSC source 50. This technique may, therefore, provide for an OTDR-type measurement similar to the one described in accordance with FIG. 3. Obviously, the use of two light sources (Optical Service Channel or otherwise) may further yield some chromatic dispersion information.

In another embodiment, the OSC laser source 50 may be used to determine, for example, the fiber attenuation in an application similar to the embodiment presented in FIG. 2. For example, the OSC laser source 50 may be operated so as to launch an optical pulse into the length of optical transmission fiber 40. The sample photodetector 49 may then be used to detect and measure the power in the residual pulse arriving at WDM filter 43. In this way, the attenuation of the optical transmission fiber 40 as it applies to the particular operating wavelength of the OSC laser source 50 may be determined.

Advantageously, then, most of the components required to perform the characterization technique of the present invention are already embedded in existing optical transmission equipment, thereby eliminating the effort currently required to test optical fibers. Although it is well understood to embed test equipment into a system application (e.g. conventional OTDR), such methods are necessarily more expensive than the present invention since they require the use of additional laser sources and costly filters. In the technique of the present invention, fiber characterization information is provided at little additional cost over the Raman pump lasers which are already embedded in most transmission equipment to facilitate Raman amplification within the fiber medium. Subsequently, only low-cost detectors are needed to detect and measure the residual Raman light or backscatter reflections.

In the future, all transmission system vendors will require extremely accurate fiber characterization data from their customers in order to specify aggressive (i.e. high capacity and long reach) fiber optic transmission systems. The high capacity optical transport business is growing at an astonishing rate each year due to the explosive growth in Internet applications. In order to stay competitive, transmission system vendors must meet and exceed their competition's ability to specify the highest capacity, longest reach systems. In addition, the commercial use of Raman amplification to extend the distance between amplifier sites is becoming more and more popular thereby providing a readily available and cost-effective platform for implementation of the inventive technique.

While preferred embodiments of the invention have been described and illustrated, it will be apparent to those skilled in the art that numerous modifications, variations and adaptations may be made without departing form the scope of the invention as defined in the claims appended hereto.

What is claimed is:

1. In an optical transmission system in which at least one optical source is connected to a first end of an optical transmission fiber and in which traffic signals are transmitted from a second end of the optical transmission fiber to the first end, a method of characterizing the optical transmission fiber comprising:

operating the optical source so as to launch an optical signal at a respective wavelength into the first end of the optical transmission fiber;

detecting at the second end of the optical transmission fiber a residual optical signal resulting from the optical signal launched into the first end of the optical fiber; and characterizing the optical transmission fiber on the basis of the detected residual optical signal;

whereby the optical signal and traffic signals may exist simultaneously allowing the optical transmission fiber to be characterized both in the presence and absence of said traffic signals on the optical transmission fiber.

2. A method according to claim 1 wherein the at least one optical source is a Raman pump laser.

3. A method according to claim 1 wherein the at least one optical source is an optical service channel (OSC) laser source.

4. A method according to claim 1 wherein an estimate for the attenuation of the optical transmission fiber is computed based on the optical signal launched into the first end of the optical transmission fiber and the residual optical signal detected at the second end of the optical transmission fiber.

5. In an optical transmission system having a plurality of optical sources connected to a first end of an optical transmission fiber and wherein each of said plurality of optical sources is operable at a particular wavelength and in which traffic signals are transmitted from a second end of the optical transmission fiber to the first end, a method of characterizing the optical transmission fiber comprising:

operating the plurality of optical sources so as to launch a plurality of optical signals into the first end of the optical transmission fiber;

detecting at the second end of the optical transmission fiber a plurality of residual optical signals resulting from the plurality of optical signals launched into the first end of the optical transmission fiber; and characterizing the optical transmission fiber on the basis of the plurality of residual optical signals detected at the second end of the optical transmission fiber;

whereby the optical signals and traffic signals may exist simultaneously allowing the optical transmission fiber to be characterized both in the presence and absence of said traffic signals on the optical transmission fiber.

6. A method according to claim 5 wherein the optical transmission fiber is characterized for a wavelength band defined by the plurality of optical sources connected to the first end of the optical transmission fiber.

7. A method according to claim 6 wherein an estimate for the chromatic dispersion of the optical transmission fiber for the wavelength band defined by the plurality of optical sources connected to the first end of the optical transmission fiber is computed based on the plurality of optical signals launched into the first end of the optical transmission fiber and the plurality of residual optical signals detected at the second end of the optical transmission fiber.

8. A method according to claim 6 wherein an estimate for the attenuation of the optical transmission fiber for the wavelength band defined by the plurality of optical sources connected to the first end of the optical transmission fiber is computed based on the plurality of optical signals launched into the first end of the optical transmission fiber and the plurality of residual optical signals detected at the second end of the optical transmission fiber.

9. In an optical transmission system in which at least one Raman pump laser is connected to a receive end of an optical transmission fiber, a method of characterizing the optical transmission fiber comprising:

operating the at least one Raman pump laser so as to launch Raman pump light into the receive end of the optical transmission fiber;

detecting at a transmit end of the optical transmission fiber residual Raman pump light resulting from the Raman pump light launched into the receive end of the optical transmission fiber; and characterizing the optical transmission fiber on the basis of the residual Raman pump light detected at the transmit end of the optical transmission fiber;

whereby the Raman pump light and traffic signals may exist simultaneously allowing the optical transmission fiber to be characterized both in the presence and absence of said traffic signals on the optical transmission fiber.

10. A method according to claim 9 wherein at least one photodetector is provided at the transmit end of the optical transmission fiber to detect the residual Raman pump light.

11. A method according to claim 9 wherein an estimate for the attenuation of the optical transmission fiber is computed based on the Raman pump light launched into the receive end of the optical transmission fiber and the residual Raman pump light detected at the transmit end of the optical transmission fiber.

12. A method according to claim 9 wherein an estimate for the chromatic dispersion of the optical transmission fiber is computed based on the Raman pump light launched into the receive end of the optical transmission fiber and the residual Raman pump light detected at the transmit end of the optical transmission fiber.

13. A method according to claim 9 wherein the at least one Raman pump laser connected to the receive end of the optical transmission fiber comprises a plurality of Raman pump lasers each operating at a particular Raman pump wavelength.

14. A method according to claim 13 wherein the Raman pump light launched into the receive end of the optical transmission fiber comprises a plurality of Raman pump wavelengths corresponding to the plurality of Raman pump lasers connected to the receive end of the optical transmission fiber.

15. A method according to claim 14 wherein the residual Raman pump light detected at the transmit end of the optical transmission fiber comprises a plurality of residual Raman pump wavelengths resulting from the plurality of Raman pump wavelengths launched into the receive end of the optical transmission fiber.

16. A method according to claim 15 wherein a plurality of photodetectors are provided at the transmit end of the optical transmission fiber to detect the plurality of residual Raman pump wavelengths resulting from the plurality of Raman pump wavelengths launched into the receive end of the optical transmission fiber.

17. A method according to claim 14 wherein the optical transmission fiber is characterized for a wavelength band defined by the plurality of Raman pump wavelengths launched into the receive end of the optical transmission fiber.

18. A method according to claim 16 wherein each of said plurality of photodetectors at the transmit end of the optical transmission fiber collects a power measurement for a particular residual Raman pump wavelength detected at the transmit end of the optical transmission fiber.

19. A method according to claim 18 wherein each of said plurality of photodetectors at the transmit end of the optical transmission fiber further collects a phase measurement for a particular residual Raman pump wavelength detected at the transmit end of the optical transmission fiber.

20. A method according to claim 18 wherein the power measurements collected for each of said plurality of residual Raman pump wavelengths are processed so as to compute the attenuation profile of the optical transmission fiber in a wavelength band defined by the plurality of Raman pump wavelengths launched into the receive end of the optical transmission fiber.

21. A method according to claim 19 wherein the power and phase measurements collected for each of said plurality of residual Raman pump wavelengths are processed so as to compute the chromatic dispersion profile of the optical transmission fiber in a wavelength band defined by the plurality of Raman pump wavelengths launched into the receive end of the optical transmission fiber.

22. In an optical transmission system in which at least one OSC laser source is connected to a first end of an optical transmission fiber and in which traffic signals are transmitted from a second end of the optical transmission fiber to the first end, a method of characterizing the optical transmission fiber comprising:

operating the at least one OSC laser source so as to launch an optical signal into the first end of the optical transmission fiber;

detecting at the second end of the optical transmission fiber a residual optical signal resulting from the optical signal launched into the first end of the optical transmission fiber; and characterizing the optical transmission fiber on the basis of the residual optical signal detected at the second end of the optical transmission fibers;

whereby the optical signal and traffic signals may exist simultaneously allowing the optical transmission fiber to be characterized both in the presence and absence of said traffic signals on the optical transmission fiber.

23. A method according to claim 22 wherein at least one detector is provided at the second end of the optical transmission fiber to detect the residual optical signal.

24. A method according to claim 22 wherein an estimate for the attenuation of the optical transmission fiber is computed based on the optical signal launched into the first end of the optical transmission fiber and the residual optical signal detected at the second end of the optical transmission fiber.

25. In an optical transmission system for transmitting multi-channel optical signals over an optical transmission path, the optical transmission path comprising an optical transmission fiber interposed between a first node and a second node and where in normal operation the multi-channel optical signals are transmitted over the optical transmission fiber from the first node to the second node, a method for characterizing the optical transmission fiber comprising:

injecting a plurality of counter-propagating Raman pump wavelengths into the optical transmission fiber at the second node for transmission to the first node;

collecting a phase and power measurement for each of said plurality of counter-propagating Raman pump wavelengths at the first node; and processing the phase and power measurements collected at the first node for each of said plurality of counter-propagating Raman pump wavelengths so as to compute an estimate of the attenuation profile for the optical transmission fiber;

whereby the Raman pump wavelengths and traffic signals may exist simultaneously allowing the optical transmission fiber to be characterized both in the presence and absence of said traffic signals on the optical transmission fiber.

26. A method according to claim 25 wherein the estimate of the attenuation profile for the optical transmission fiber is computed for a wavelength band defined by the plurality of counter-propagating Raman wavelengths injected into the optical transmission fiber at the second node.

27. A method according to claim 25 wherein the phase and power measurements collected at the first node for each of said plurality of counter-propagating Raman pump wavelengths are further processed so as to compute an estimate of the chromatic dispersion profile for the optical transmission fiber.

28. A method according to claim 27 wherein the estimate of the chromatic dispersion profile for the optical transmission fiber is computed for a wavelength band defined by the plurality of counter-propagating Raman wavelengths injected into the optical transmission fiber at the second node.

29. A method according to claim 27 wherein the computed estimates of the attenuation and chromatic dispersion profiles for the optical transmission fiber are processed to identify the type of optical transmission fiber.

30. A method according to claim 29 wherein the type of optical transmission fiber is identified by comparing the computed estimates of the attenuation and chromatic dispersion profiles for the optical transmission fiber to a set of known characteristics for a number of different types of optical transmission fiber.

31. A method according to claim 25 wherein the first and second nodes are wavelength division multiplexed (WDM) filters.

32. A method according to claim 25 wherein the first node is a WDM splitter and the second node is a WDM combiner.

33. A method according to claim 25 wherein a plurality of photodetectors are provided at the first node for detecting the plurality of counter-propagating Raman pump wavelengths.

34. An optical transmission system for transmitting multichannel optical signals over an optical transmission path, the optical transmission path including an optical transmission fiber interposed between a first node and a second node wherein the multi-channel optical signals are transmitted over the optical transmission fiber from the first node to the second node, the system comprising:

at least one optical light source provided at the second node operable to inject an optical signal into the optical transmission fiber for transmission to the first node;

at least one photodetector at the first node for detecting a residual optical signal resulting from the optical signal injected into the optical transmission fiber at the second node; and a processing agent for characterizing the optical transmission fiber on the basis of the optical signal injected at the second node and the residual optical signal detected at the first node;

whereby the optical signal and traffic signals may exist simultaneously allowing the optical transmission fiber to be characterized both in the presence and absence of said traffic signals on the optical transmission fiber.

35. A system according to claim 34 wherein the at least one optical light source provided at the second node is a Raman pump laser.

36. A system according to claim 34 wherein the at least one optical light source provided at the second node is an OSC laser source.

37. A system according to claim 34 wherein the at least one optical light source provided at the second node comprises a plurality of optical light sources each operating at a particular wavelength.

38. A system according to claim 37 wherein the optical signal injected into the optical transmission fiber at the second node comprises a plurality of wavelengths corresponding to the plurality of optical light sources provided at the second node.

39. A system according to claim 38 wherein a plurality of photodetectors are provided at the first node for detecting a plurality of residual wavelengths resulting from the plurality of wavelengths injected into the optical transmission fiber at the second node.

40. A system according to claim 39 wherein the processing agent for characterizing the optical transmission fiber comprises means for computing an estimate of the attenuation of the optical transmission fiber on the basis of the plurality of wavelengths injected at the second node and the plurality of residual wavelengths detected at the first node.

41. A system according to claim 39 wherein the processing agent for characterizing the optical transmission fiber comprises means for computing an estimate of the chromatic dispersion of the optical transmission fiber on the basis of the plurality of wavelengths injected at the second node and the plurality of residual wavelengths detected at the first node.

42. A system according to claim 39 wherein the processing agent comprises means for characterizing the optical transmission fiber for a wavelength band defined by the plurality of wavelengths injected into the optical transmission fiber at the second node.

43. A system according to claim 34 wherein the first and second nodes are wavelength division multiplexed (WDM) filters.

44. A system according to claim 34 wherein the first node is a WDM splitter and the second node is a WDM combiner.

45. A system according to claim 34 wherein the processing agent comprises means for computing an estimate of the attenuation of the optical transmission fiber on the basis of the optical signal injected into the optical transmission fiber at the second node and the residual optical signal detected at the first node.

46. A system according to claim 34 wherein the processing agent comprises means for computing an estimate of the chromatic dispersion of the optical transmission fiber on the basis of the optical signal injected into the optical transmission fiber at the second node and the residual optical signal detected at the first node.

* * * * *